Figure 1:
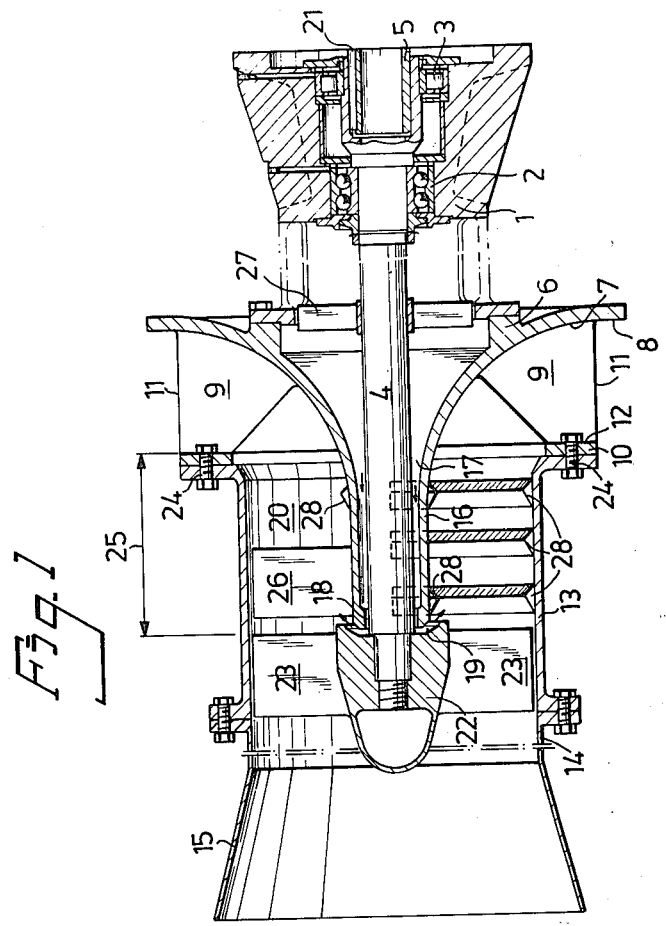

United States Patent [19]

Lindblom

[11] 4,305,894
[45] Dec. 15, 1981

[54] ARRANGEMENT IN APPARATUS FOR MIXING GASES WITH AND DISSOLVING GASES IN LIQUIDS

[76] Inventor: Harry G. Lindblom, Sala, Sweden

[21] Appl. No.: 177,750

[22] PCT Filed: Mar. 30, 1979

[86] PCT No.: PCT/SE79/00076

§ 371 Date: Nov. 30, 1979

§ 102(e) Date: Nov. 29, 1979

[87] PCT Pub. No.: WO79/00864

PCT Pub. Date: Nov. 1, 1979

[30] Foreign Application Priority Data

Mar. 31, 1978 [SE] Sweden .............................. 7803691

[51] Int. Cl.³ .............................................. B01F 3/04
[52] U.S. Cl. ..................................... 261/93; 210/220; 210/242.2; 261/DIG. 75
[58] Field of Search ..................... 261/29, 91, 93, 120, 261/121 R, 123, DIG. 75; 210/219, 220, 242 A

[56] References Cited

U.S. PATENT DOCUMENTS

| | | | |
|---|---|---|---|
| 2,186,371 | 1/1940 | Durdin, Jr. | 261/91 |
| 2,421,191 | 5/1947 | Durdin | 210/219 X |
| 2,928,661 | 3/1960 | MacLaren | 261/87 |
| 3,173,771 | 3/1965 | Barrett et al. | 55/92 |
| 3,206,176 | 9/1965 | Peterson | 261/93 X |
| 3,210,053 | 10/1965 | Boester | 210/220 |
| 3,400,918 | 9/1968 | MacLaren | 261/87 |
| 3,416,729 | 12/1968 | Ravitts et al. | 261/91 |
| 3,524,629 | 8/1970 | Culwell | 261/91 X |
| 3,559,964 | 2/1971 | Sell et al. | 261/91 |
| 3,572,658 | 3/1971 | Ravitts | 261/120 X |
| 3,576,316 | 4/1971 | Kaelin | 261/91 |
| 3,643,403 | 2/1972 | Speece | 261/91 |
| 3,779,531 | 12/1973 | White | 261/120 X |
| 3,780,998 | 12/1973 | Botsch | 261/91 |
| 3,782,702 | 1/1974 | King | 261/87 |
| 3,814,395 | 6/1974 | Kaelin | 261/87 |
| 3,846,516 | 11/1974 | Carlson | 261/91 X |
| 4,057,204 | 11/1977 | Zajac | 242/163 |

Primary Examiner—William A. Cuchinski, Jr.
Attorney, Agent, or Firm—Stevens, Davis, Miller & Mosher

[57] ABSTRACT

In an apparatus for mixing gases with and dissolving gases in bodies of liquid there is an axial-flow pump impeller (22), which is arranged to raise the liquid through a substantially vertical riser line (20) whose lower end exhibits an inlet (15) for the liquid and whose upper end forms an outlet (11) for the pumped liquid and is defined by guide surfaces (7) arranged to deflect the liquid radially from the axis of the riser line (20), the drive shaft (4) of the impeller extending coaxially with the riser line from a drive unit, located above the said body of liquid, to the impeller (22), the improvement in which the drive shaft (4) is enclosed by a stationary line (16) whose inner wall together with the drive shaft (4) defines a gas-communication passage (17) whose lower end discharges into the riser line (20) via at least one outflow passage (19) directed substantially radially to the general center line, said gas-communication passage openly communicating with a gas source, such as the surrounding atmosphere, as illustrated in FIG. 1.

10 Claims, 4 Drawing Figures

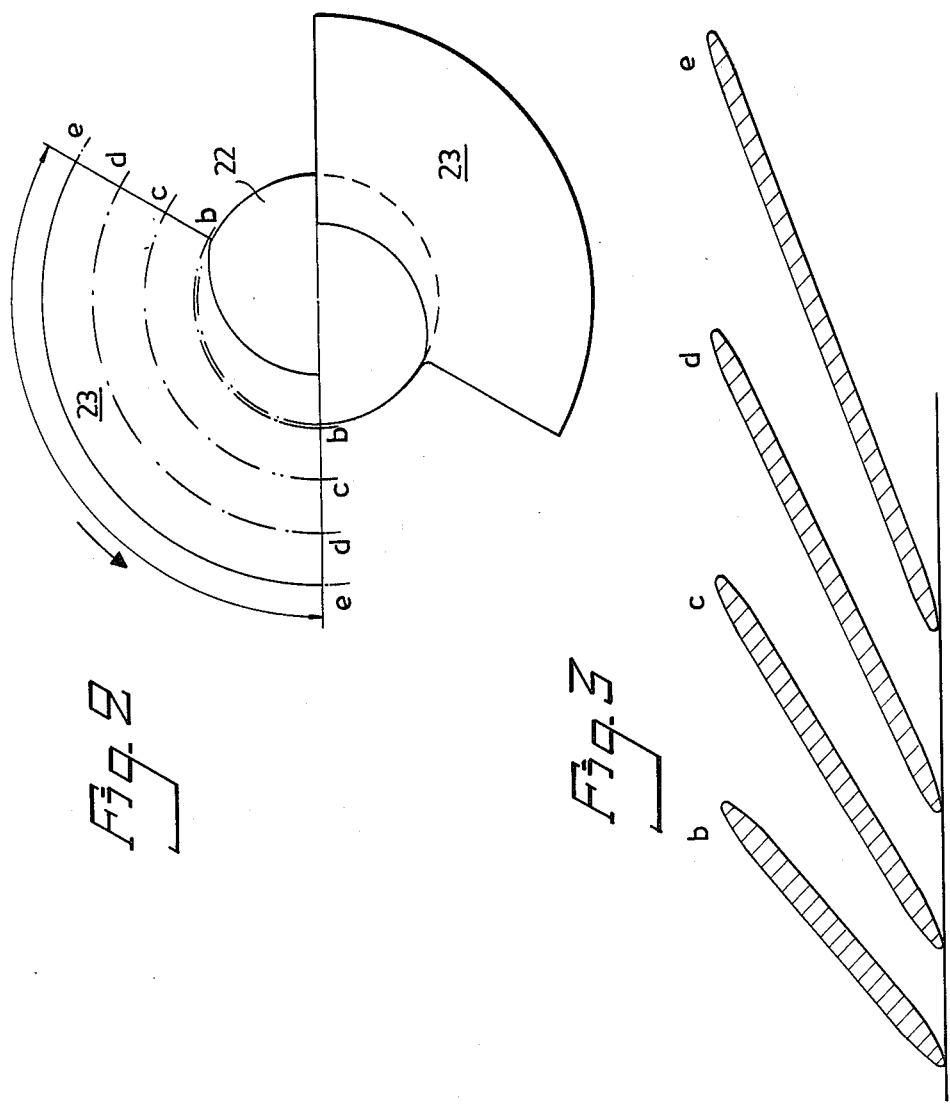

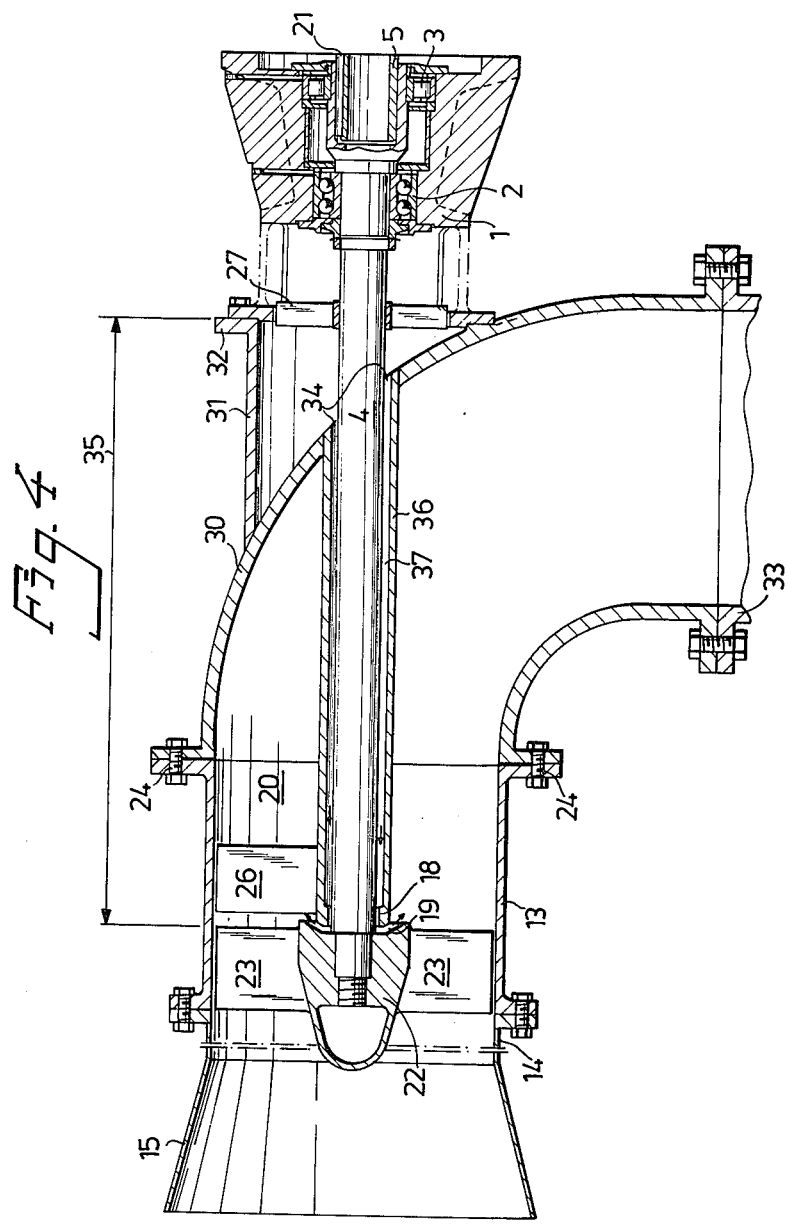

ARRANGEMENT IN APPARATUS FOR MIXING GASES WITH AND DISSOLVING GASES IN LIQUIDS

The present invention relates to an arrangement in apparatus for mixing gases with and dissolving gases in bodies of liquid, which are raised by means of an axial-flow pump through a substantially vertical riser line whose lower end exhibits an inlet for the liquid and whose upper end forms an outlet for the pumped liquid and is defined by guide surfaces which deflect the liquid radially from the axis of the riser line, and drive shaft of the impeller of said pump extending coaxially with the riser line from a drive unit, located above the said body of liquid, to said impeller.

Apparatus for circulating and oxygenating or aerating bodies of liquids in, for example, tanks, ponds or watercourses have previously been proposed, in which apparatus liquid is transported by means of an axial-flow pump against abutment surfaces located above the surface of the body of liquid. Examples of such apparatus are described in the U.S. Pat. No. 2,186,371.

In other known apparatus used for similar purposes there are used rotors which have the form of a closed or open impeller having a vertical axis whose liquid-suction openings are located beneath the surface of the liquid, the liquid being slung radially outwardly from the rotor, normally in a slightly upwardly direction, above the surface of the liquid. In the case of aerators of this kind, in which the pumped liquid is slung out over the surface of the said body of liquid, the extent to which the gas is mixed with and dissolved in the liquid is not altogether satisfactory, owing to the fact that the gas is not in contact with the liquid for a sufficient length of time and because the effective liquid surface area presented to the gas is too small.

Certain known apparatus of the latter kind exhibit means in the form of closed centrifugal impellers, in which the suction side of the impeller and/o r locations between the suction inlet and the periphery are in communication with the atmosphere. During rotation of the impeller, air is drawn thereinto and thus aeration of the liquid begins within the impeller itself. The efficiency of such impellers, however, is much too low for the purpose in question, and consequently the amount of air admixed with and dissolved in the liquid is correspondingly low, calculated in the number of kWh consumed.

In the Swedish Pat. No. 354 789 there is illustrated and described, however, an apparatus having an axial impeller which is arranged to rotate about a vertical axis and which urges the liquid up through a pipe. Arranged on the inner surfaces of the pipe are guide vanes which are located above the impeller itself and which are arranged to stabilize the flow of liquid. The impeller is mounted on a hollow shaft which communicates with the atmosphere. Small holes through which gas can penetrate into the liquid are arranged in the hollow shaft, above the level of the guide vanes. In front of the holes there are provided gas-dispersing blades which surround the holes and which are suitably of V-shaped configuration with the apex of the V located in front of the holes. These blades decrease the through-flow area in the pipe and consequently impair the pumping capacity.

The object of the present invention is to provide in an apparatus for mixing a gas with and dissolving said gas in a liquid an arrangement which enables the said admixing and dissolving of the gas to be effected more efficiently per kWh consumed; and which has an impeller of high efficiency, which provides for a higher liquid velocity than prior art apparatus, and in which the axial liquid flow is uniform over the whole flow area.

Accordingly, the invention consists in an arrangement which is mainly characterized by the fact that the drive shaft is enclosed by a stationary cylindrical housing whose inner wall, together with the drive shaft, defines a gas-communication passage having a lower end which opens into the riser line via at least one outflow passage extending substantially radially to the general centre line of the apparatus, said gas-communication passage openly communicating with a gas source, such as the surrounding atmosphere.

The arrangement according to the invention includes a drive unit having an output shaft for the impeller. The drive unit is mounted on a distributor head, provided with guide blades. The guide blades maybe of any number, but are suitably three or four. The distributor-head is mounted on a tubular riser line, which below the impeller merges with a downwardly conical, flared suction pipe. The distributor-head has a rotational-symmetrical curved deflecting surface, which changes the direction of movement of the liquid from a vertical direction to an almost horizontal direction. The curved surface continues downwardly into a stationary housing which surrounds the shaft and which terminates immediately above the impeller and opens into the riser line. The liquid flowing through the riser line entrains therewith, by an ejector action, the gas flowing from the gas source, which gas is admixed with the liquid such that said dissolution of the gas begins already in the riser line, upstream of the distributor head.

One prerequisite herefor is that the pressure drop in the distributor head is less than 4 meters water-column. The speed of which the water moves should be at least about 5 m/s, in order for an acceptable ejector effect to be obtained.

In a preferred embodiment of the axial-flow pump used in conjunction with the present invention, the pump blades have straight leading and trailing edges and a pitch which decreases with increasing distances from the centre. Suitably the impeller has four blades which partially project beyond one another, although the use of a smaller (at least two) or a larger number of blades lies within the scope of the invention. The blades conveniently have a configuration such that a section taken through respective blades at mutually the same distance from the centre gives a straight sectional surface.

An impeller of this design has been found experimentally to have a very high efficiency, e.g. an efficiency of approximately 80 percent.

Guide vanes may optionally be arranged downstream of the impeller, to counteract the rotation of the flow of liquid and to contribute to effective admixture of the gas with the liquid. This is particularly favourable when the guide vanes provide a certain degree of cavitation and are so located that the drawn-in gas has access to the rear side of the vanes.

In a further embodiment of the apparatus according to the invention, the drive unit is alternatively mounted on a curved pipe, i.e. an elbow, provided with an aperture through which the drive shaft can pass. The drive shaft and drive unit are located on the pressure side of the pump. Also in this case, the part of the shaft located inside the elbow is enclosed by a stationary housing which is connected at one end thereof to the elbow and is open to atmosphere or some other gaseous medium, and at the other end terminates openly immediately adjacent the impeller. Between the said housing and said shaft the gas-communication passage conveniently exhibits; closely adjacent the impeller, a restriction which forms the mouth or discharge opening of said slot. Arranged between the lower end of said line and the hub of the impeller is an ring-shaped gap. In other respects the apparatus according to the invention is similar in this embodiment to the apparatus of the first described embodiment.

An arrangement according to the invention affords the following advantages:

a high pumping efficiency with a substantially axial flow and high liquid speeds, better dispersion of the liquid leaving the distributor head, mixing and dissolution of the gas in the liquid inside the apparatus between the impeller and the distributor head, better dissolution of gas in the liquid per kWh consumed.

So that the invention will be more readily understood and further features thereof made apparent, exemplary embodiments of the invention will now be described with reference to the accompanying schematic drawings, in which FIG. 1 is an axial sectional view of an apparatus provided with an arrangement according to the invention, FIG. 2 is a horizontal view of an impeller of a preferred embodiment of the arrangement, seen from the inlet side of the pump, FIGS. 3b-e are crossectional views of pump blades at different radial distances from the centre of the impeller, and FIG. 4 is an axial sectional view of a further embodiment of the invention. The pump blades and the guide vanes are shown with the greatest radial extension in the plane of the drawing. FIGS. 1 and 4 illustrate different elements in the respective left-hand and right-hand halves of the figure.

The apparatus according to the invention illustrated in FIG. 1 comprises a drive unit having a frame 1 provided with bearings 2, 3 for a pump shaft 4. Arranged in the upper end of the shaft is a recess in which a bush 5 having spline-like elements 21 for a flange-mounted standard motor is arranged. Alternatively, a specially designed motor having a long drive shaft can be used.

The drive unit is mounted on a distributor head 6 which exhibits a rotational-symmetrical, curved deflecting surface 7 having an at least approximately horizontal straight outer part 8.

The distributor head 6 is also provided with fixed guide blades 9, which merge at the bottom thereof with an annular element 10 which forms the lower defining surface 12 of the distributor opening 11. Fixed to the bottom surface of the annular element 10 is a pipe 13 which continues downwardly into a suction pipe 14 having a suction funnel 15. The curved deflecting surface 7 of the distributor head 6 merges downwardly with a cylindrical stationary housing 16 which embraces the shaft 4. Between the shaft 4 and the stationary housing 16 there is arranged a gas-communication passage 17 having a top which communicates with a gas source or with atmosphere, and a bottom which communicates with a riser line 20 via a slot 18 located between the lowermost part of the stationary housing 16 and the shaft 4, and a ring-shaped gap 19 arranged between the end surface of the stationary housing 16 and the hub of the impeller 22, said riser line 20 being defined on the outside thereof by the pipe 13. The slot or restriction 18 may alternatively be omitted.

On the end of the shaft 4 there is mounted an axial-flow pump impeller 22 having at least two blades 23.

The apparatus is mounted on a suitable frame (not shown) or alternatively on a buoyant body (not shown), for example, by means of bolts 24, through which the annular element 10 is connected with the pipe 13 such that the level of liquid is located within a zone 25 which is limited upwardly by the lower defining surface 12 of the distributor opening 11 and downwardly by the upper edge of the pump blades 23.

In operation, the blades 23 pump the liquid up into the riser line 20, whereafter the liquid is deflected by the rotational symmetrical deflection surface 7,8 and the blades 9 and is sprayed out through the opening 11. Owing to the high speed of the liquid, there is obtained an ejector effect, and air is drawn in through the cylindrical gap 17, the slot 18 and the gap 19, this air being admixed with the liquid in the riser line 20. The gas is admixed thoroughly with the liquid in the riser line 20, particularly in the region of the deflecting surface 7, where stong turbulence occurs.

When the impeller stops, the liquid will move up the passage 17, but is rapidly drawn down again when the impeller is restarted.

Guide vanes 26 may be arranged in the riser line 20 in order to stabilize the flow of liquid and to retard the rotary movement thereof caused by the impeller. Each of the guide vanes may be attached to the pipe 13 or to the stationary housing 16, conveniently immediately above the impeller 22.

Illustrated on the left of FIG. 1, is a guide vane 26. The positioning of the guide vanes 26 on the stationary housing 16 affords the advantage whereby it is possible to remove the drive unit, the distributor head 6 and the impeller 22 as a single unit, without it being necessary to remove the pipe 13 and the suction pipe 14 from the frame or the float respectively, thereby considerably facilitating and simplifying repair work and servicing operations.

The guide vanes 26 contribute to an improved admixture of the gas with the liquid when the flow of liquid is deflected. Adjacent a guide vane, which is arranged to change the direction of movement of a flow of liquid, there occurs an underpressure on the trailing side of the guide vane seen in the direction of flow. If the direction of flow is strongly deflected, this underpressure will be so great that cavitation occurs at the trailing side of the guide vanes. When air is introduced to the region of the trailing side of the guide vanes, the air will be dispersed and mixed with the liquid along the whole upper edge of the guide vanes.

A further improved admixture of gas with and dissolution of gas in the liquid is obtained when the shaft 4 is provided at the top thereof with a fan wheel 27 which forces the gas down through the gas-communication passage 17.

The admixture of gas with liquid can be even further improved by providing the housing 16 or the pipe 13 with turbulence-generating projections 28. These projections may have the form of annular projections extending from the pipe 13 and/or the housing 16, although other means arranged for the same purpose lie within the scope of the invention. In particular, an annular raised portion having a sharp edge may be mounted on the wall of the housing 16 above the impeller 22 or the guide vanes 26 (when such are provided) and closely adjacent thereto.

The use of a construction which includes a motor frame 1 and a motor of standard design affords considerable advantages with respect to maintenance, since in the event of the motor breaking down it is only necessary to change the standard motor for another, without requiring spare parts of special manufacture.

FIG. 2 is a horizontal view, seen from the inlet side, of an impeller 22 for an arrangement according to the invention. The illustrated impeller has only two blades, each of which includes 120° of arc. The blades have a pitch which decreases towards the periphery, such that the liquid is imparted the same axial movement, irrespective of the distance from the centre. This is achieved by forming the blades such that a section through respective rotor blades at the same radial distances from the centre is straight when developed in a plane. This is evident from FIGS. 3 b-e, which illustrate sections through a blade along the lines b—b, c—c, d—d and e—e.

By providing the impeller with more than two blades, the efficiency of the impeller is increased still further, an impeller having four blades each including about 100° of arc being particularly preferred. Thus, the blades will project beyond one another. An impeller having four blades also affords certain advantages from the aspect of manufacture.

The impeller has a very broad hub, that is of relatively large diameter, which causes the liquid to be moved at a high speed, even in those areas adjacent the hub. The relationship between the largest diameter and the hub diameter should be at most 3.0. A still better effect is obtained when this relationship is 2.75, while a still better effect is obtained when said relationship is 2.5. Extra powerful effects are obtained when the said relationship lies between 2.25–2.0, although in this case the capacity of the impeller decreases, since the hub occupies such a large part of the section as a whole.

As will be seen from the Figures, the hub of the impeller 22 has, at the upper end of said hub, a diameter which greatly exceeds the diameter of the housing 16.

A conical section of the hub contributes further to an increased effect and an increase in the velocity at which the liquid moves in the region nearest the hub, since the liquid nearest the hub on the inlet side is subjected to pressure and is accelerated as it moves along the conical surface and is forced upwardly by the blades, which blades extend along the whole of the length of the conical surface.

FIG. 4 illustrates an alternative embodiment in which an apparatus having the arrangement according to the invention is mounted in a line for conducting a liquid which is to be admixed with gas and in which the gas shall dissolve, at least in part. Corresponding elements of the embodiment illustrated in FIG. 4 have been identified with the same references as those used in FIG. 1.

A drive means 1,2,3,5,21 including a motor of standard design and an output shaft 4, as described with reference to FIG. 1, is mounted on an elbow 30, on a separate, tubular projection 31 having a mounting flange 32. The elbow is connected at the inlet end to a pipe 13. The elbow is connected at the outlet end to an outlet pipe 33. The shaft 4 is enclosed by a stationary housing 36 which is fixedly mounted at one end to the outer surface of the elbow 30. Arranged between the shaft 4 and the housing 36 is a passage 37 which communicates with atmosphere at its upper end, or some other gas source, and communicates at the bottom thereof through the slot 18 and the ring-shaped gap 19, with the riser pipe 20 and its attachment to the elbow 30 and the outlet pipe 33.

This apparatus is mounted in a manner such that the level of liquid will be located within a zone 35 which is limited downwardly by the upper edge of the blades and upwardly by the upper edge of the mounting flange 32.

When the mounting flange 32 is connected with the main part of the elbow 30, by means of a perforated, tubular projection, or in some other way, the level of liquid may not, of course, rise above the opening 34 of the line 37, in the outside of the elbow 30.

It should be ensured that the liquid does not approach the upper boundary too closely, since liquid may then enter the passage 37.

The described apparatus are primarily intended for the oxygenation of sewage water in biological purification works and biological dams and lakes and water masses which are deficient in oxygen, but may also, of course, be used in connection with any liquid whatsoever which is to be admixed with a gas.

The invention is not restricted to the illustrated and described embodiments thereof, but can be modified within the scope of the following claims.

I claim:

1. An apparatus for mixing gases with and in a body of liquid comprising:
    a substantially vertical riser body having an inlet for liquid at its lower end and an outlet for a liquid-gas mixture at its upper end;
    guide surfaces at said upper end to deflect the outgoing liquid radially outwardly from the riser body;
    drive means located above said riser body and having a drive shaft extending downwardly through the center of the riser body;
    an axial pump impeller carried on the lower end of said shaft for pumping liquid up said riser body;
    a stationary housing enclosing said drive shaft, the inner wall of the housing and the drive shaft defining a gas communication passage having a lower end which opens into the riser body via at least one outflow passage extending substantially radially outwardly, said gas communication passage being connected with a gas source, such as the surrounding atmosphere.

2. The apparatus of claim 1, in which the impeller has a central hub and the stationary housing terminates downstream of the impeller hub with the gas outflow passage being located between the impeller hub and the end of the housing.

3. The apparatus of claim 1, in which the gas communication passage discharges coaxially with the drive shaft in the lower end of said stationary housing and that at a relatively small distance beneath said discharge opening of said passage there is mounted coaxially on the drive shaft a substantially rotational-symmetrical body, and the end facing said discharge opening has a ring-like surface whose outer diameter is greater than the outer diameter of the stationary housing at its end.

4. The apparatus of claim 3, in which the lower end surface of the stationary housing, together with the ring-shaped surface of the rotational-symmetrical body, defines a ring-shaped gap and forms said gas-outflow passage.

5. The apparatus of claims 3 or 15, in which the rotational-symmetrical body is the impeller hub.

6. The apparatus of claim 5, in which the ratio of the impeller blade diameter to the hub diameter is between 3.0 and 2.0 and preferably 2.75 to 2.25.

7. The apparatus of claim 1, including a fan wheel downstream from the impeller for additional positive circulation of gas through the gas communication passage.

8. The apparatus of claim 1, in which the impeller blades have a form such that sections therethrough at mutually the same radial distances from the center of rotation form a straight line when said sections are developed in a plane, and that the leading and trailing edges of the blades are substantially straight and at right angles to said axis of rotation.

9. The apparatus of claim 1, in which the impeller has four blades which partially overlap each other.

10. The apparatus of claim 1, in which the liquid flows through the riser body at a rate of 5 meters per second.

* * * * *